United States Patent
Liao (12)

(10) Patent No.: US 6,379,061 B1
(45) Date of Patent: Apr. 30, 2002

(54) SILICON CAP FOR USE IN THE POINTING STICK DEVICE

(75) Inventor: Pin-Chien Liao, Taoyuan (TW)

(73) Assignee: Acer Communication & Multimedia, Inc. (TW)

( * ) Notice: Subject to any disclaimer, the term of this patent is extended or adjusted under 35 U.S.C. 154(b) by 0 days.

(21) Appl. No.: 09/432,982

(22) Filed: Nov. 3, 1999

(30) Foreign Application Priority Data

Feb. 9, 1999 (TW) ......................................... 88101985 A

(51) Int. Cl.[7] .................................................. B41J 5/12
(52) U.S. Cl. ........................................ 400/491; 400/490
(58) Field of Search ................................. 400/491, 495, 400/492, 490; 345/174, 161, 157, 168, 160; 428/90, 86, 96, 97

(56) References Cited

U.S. PATENT DOCUMENTS

| | | | | | |
|---|---|---|---|---|---|
| 4,188,429 A | * | 2/1980 | Braconnier et al. | ............ | 428/85 |
| 4,568,590 A | * | 2/1986 | Iwai | ............................. | 428/85 |
| 5,134,008 A | * | 7/1992 | Alm | ............................. | 428/90 |
| 5,746,302 A | * | 5/1998 | Bowman | ..................... | 198/496 |
| 5,754,166 A | * | 5/1998 | Baba | ........................... | 345/157 |
| 5,798,754 A | | 8/1998 | Selker et al. | ............... | 345/161 |
| 6,171,677 B1 | * | 1/2001 | Oikawa | ....................... | 428/90 |

* cited by examiner

Primary Examiner—John S. Hilten
Assistant Examiner—Anthony H. Nguyen
(74) Attorney, Agent, or Firm—Oppenheimer Wolff & Donnelly, LLP

(57) ABSTRACT

A removable silicon cap mounted on the top of a cursor control device is provided. The silicon cap has an outer surface, which is covered with an adhesive layer, and an inner surface. A plurality of fibers are attached to the adhesive layer. The silicon cap characterizes in that each fiber has a column portion and a base portion. The base portion is embedded in the adhesive layer to enhance the detachment-resistant capability of the fiber during use of the cursor control device.

8 Claims, 4 Drawing Sheets

SILICON CAP FOR USE IN THE POINTING STICK DEVICE

FIELD OF INVENTION

The invention relates to a removable silicon cap mounted on the top of a pointing stick device.

BACKGROUND OF INVENTION

The traditional cursor controller, e.g. joystick or mouse, is not suitable for the notebook type computer system due to its size. As shown respectively in FIG. 1 (A) and FIG. 1(B), a keyboard 10 with a pointing stick 12 has been widely used in the notebook type computer due to its miniature structure. The state-of-art cursor controller device is disclosed in U.S. Pat. Nos. 5,521,596 and 5,640,178.

Typically, a resilient removable hollow grip cap is mounted on the top of the state-of-art pointing stick. The resilient hollow grip cap may be the silicon cap. During operation, by exerting force onto the tip of the pointing stick 12, a sensor (not shown) deforms accordingly and a corresponding signal change is received by a controller (not shown). The controller then controls cursor movement.

Through the silicon cap's resilient property, the user can obtain a good feedback feeling from the stick during cursor movement operation. However, the silicon cap's surface is easily contaminated by the dirt or skin oil on user's fingers after extended use. The dirt or skin oil residing on the silicon cap's surface may cause the surface to become slippery. This undermines the sensations fed from the cap's surface to the user, and good sensory feedback is required to precisely control the movement of the cursor.

To solve the drawbacks mentioned above, as shown in FIG. 2(A) and FIG. 2(B), U.S. Pat. No. 5,798,754 discloses a silicon cap. The cap has multiple short fibers adhered to its outer surface and extending outwardly from the surface of the cap. When making the silicon cap, a liquid adhesive is applied on the outer surface of the cap. By way of an electrostatic fiber planting process, the fibers are planted into the adhesive. Afterwards, a protective coating is applied on the fibers to enhance the detachment-resistant capability of the fibers. It is observed that two processes and two material layers are required during the above-mentioned process.

SUMMARY OF INVENTION

A removable silicon cap mounted on the top of a cursor control device is provided. The silicon cap has an outer surface and an inner surface. The outer surface is covered with an adhesive layer and multiple fibers are adhered on the adhesive layer. The silicon cap characterizes in that each fiber has a column portion and a base portion, and the base portion is embedded in the adhesive layer to enhance the detachment-resistant capability of the fiber.

BRIEF DESCRIPTIONS OF THE DRAWINGS

DETAILED DESCRIPTIONS OF THE EMBODIMENTS

Figures 1A, 1B:
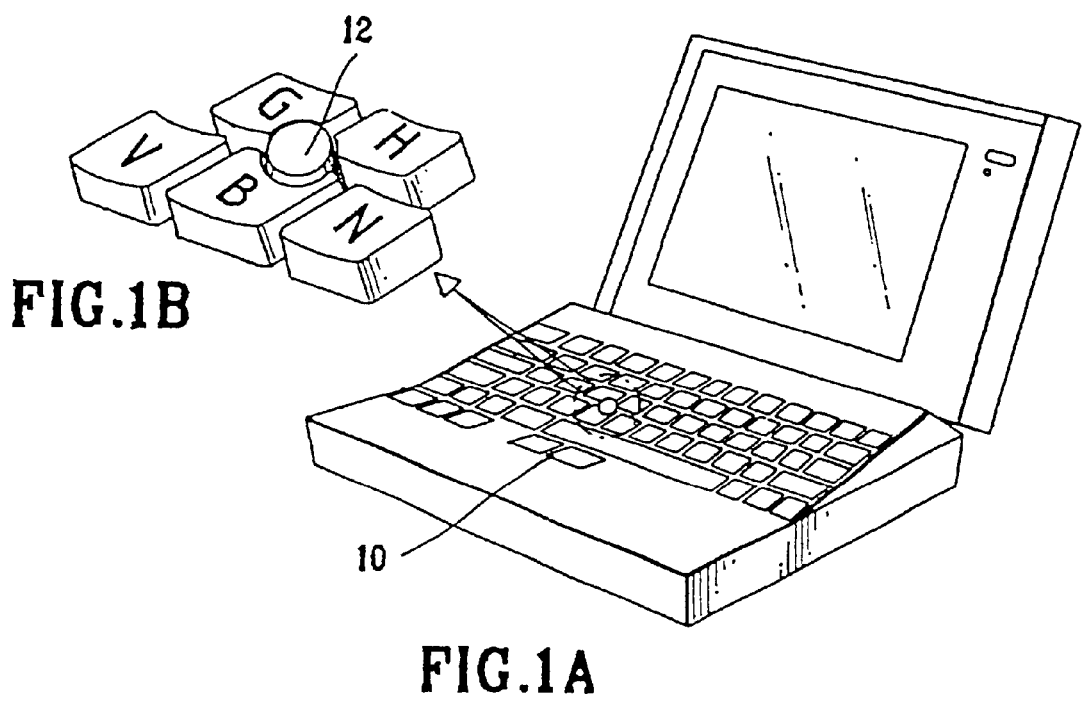
FIG. 1(A) shows a keyboard incorporating a pointing stick.
FIG. 1(B) shows a partial enlargement view of FIG. 1(A).
Figure 2A:
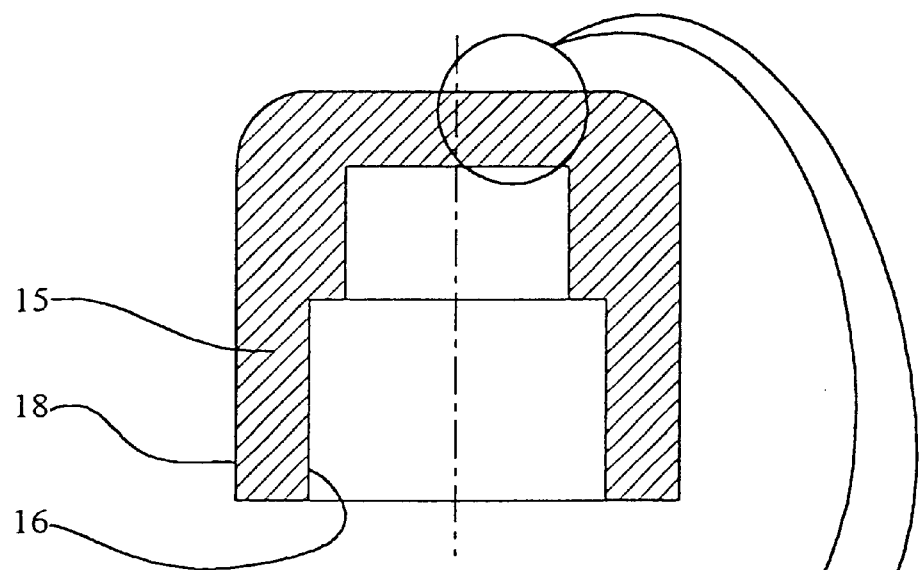
FIG. 2(A) shows a sectional view of a prior art silicon cap.
Figure 2B:
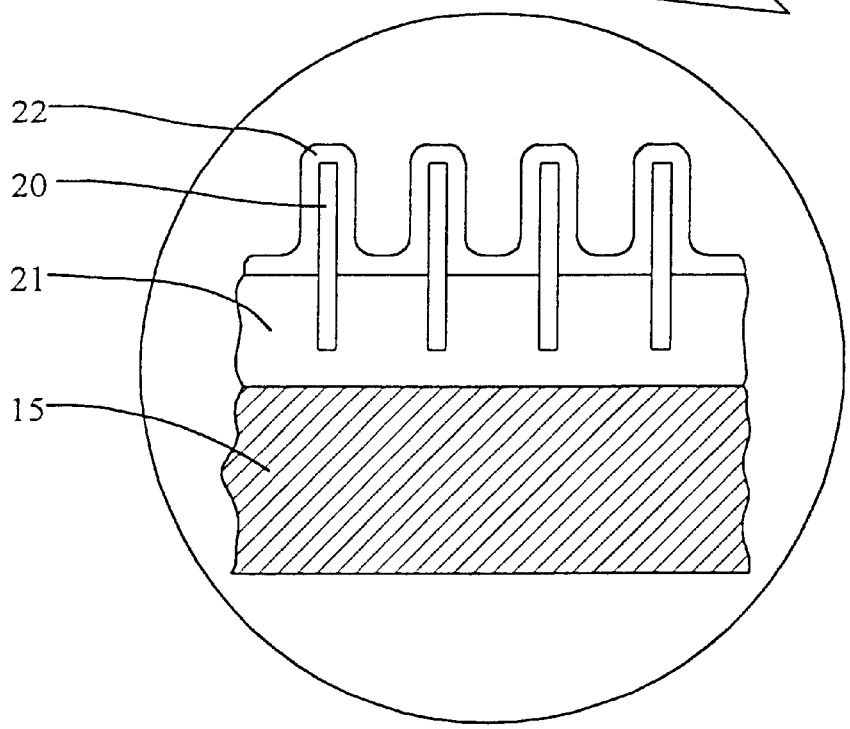
FIG. 2(B) shows a partial enlargement view of FIG. 2(A).
Figure 3:
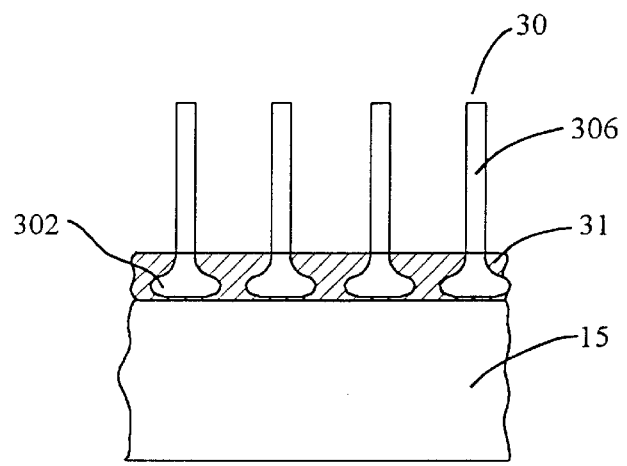
FIG. 3 shows a sectional view of the first embodiment.
Figure 4:
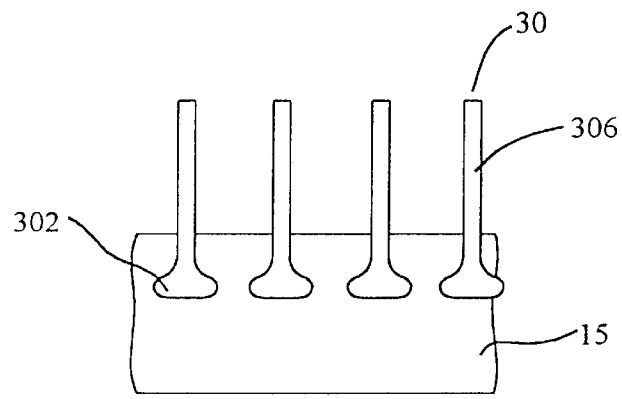
FIG. 4 shows a sectional view of the second embodiment.
Figure 5:
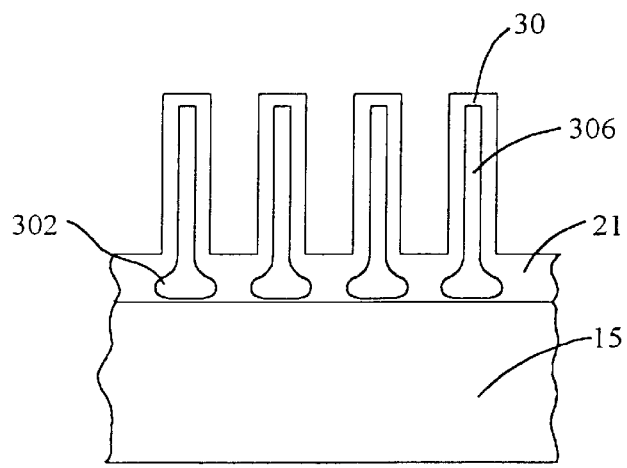
FIG. 5 shows a sectional view of the third embodiment.

As shown in FIGS. 3, 4 and 5 which disclose the embodiments of the invention, each fiber 30 includes a column portion 306 and a base portion 302. The shape of the base portion 302 may vary depending on different design choice. For instance, the base portion 302 may be in a circular plate shape, an anchor shape, a ball shape or a toothed shape. As shown in the figures, the circular plate shape is adopted in the embodiments. The fiber 30 is made of polymer material, e.g. nylon. The radius of the fiber is approximately 0.06 mm and the length is approximately 2.0 mm. In a preferred embodiment, the radius of the base portion 302 may be approximately 0.12 mm. Three embodiments of the silicon cap are introduces hereinafter.

First Embodiment

As shown in FIG. 3, the silicon cap of the invention is covered with an adhesive layer 31. Multiple fibers 30 are adhered to the adhesive layer 31 and extend outwardly from the cap 15. The fiber 30 includes a column portion 306 and a base portion 302 in the form of a circular plate. The base portion 302 is embedded into the adhesive layer 31. Due to good engagement function provided by the base portion 302, the base portion 302 prevents the fiber from being dislodged during use.

The process of making the cap 15 of the first embodiment is recited below.

(1) Using a well known compression molding or injection molding process, the silicon cap 15 is formed.

(2) Place the silicon cap 15 in an electrostatic planting (coating) system, and connect the silicon cap 15 to an electrode connected to the ground reference. It is well known that the electrostatic coating system performs the electrostatic fiber planting process. Multiple fibers 30 are disposed in the system's reservoir.

(3) An adhesive layer 31 is applied on the outer surface of the silicon cap 15. The adhesive layer may be a silane adhesive which is kept in liquid state.

(4) Via the electrostatic fiber planting process, the plurality of fibers 30 in the reservoir of the system are spread on the silicon cap's outer surface. Due to the electrostatic force, the base portion 302 of the fiber 30 is deeply buried in the adhesive layer 31.

(5) Solidify the liquid state adhesive layer 31, and the fiber 30 is then permanently adhered to the outer surface of the silicon cap 15.

Since the two ends of the fiber 30 are not identical, during step (4) one can control the action of fiber 30 so that during the planting process the identical ends of the fibers head in the same direction. In the embodiment, the fibers move toward the outer surface with the circular plate base portion heading toward the outer surface of the silicon cap.

The Second Embodiment

As shown in FIG. 4, the fiber 30 includes a column portion 306 and a base portion 302 in the form of a circular plate, and the base portion 302 is embedded into the top portion of the silicon cap 15. Due to engagement function provided by the base portion 302, the base portion 302 prevents the fiber 30 from being dislodged during use.

Figure 6A:
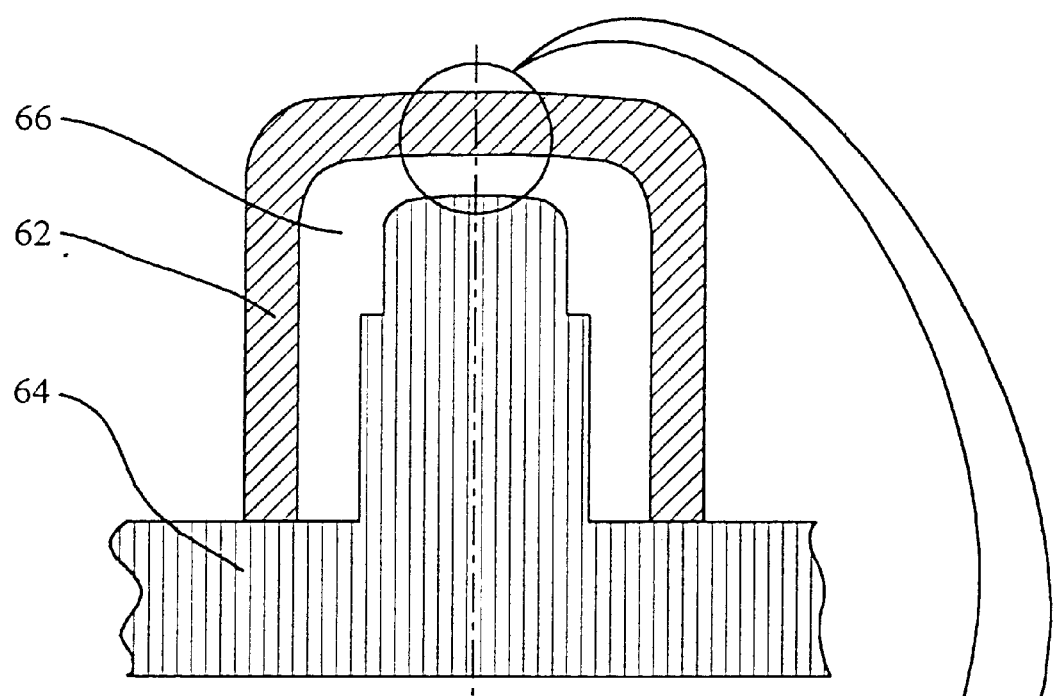
FIG. 6(A) shows the sectional view of the molds used in producing the silicon cap of the second embodiment.
Figure 6B:
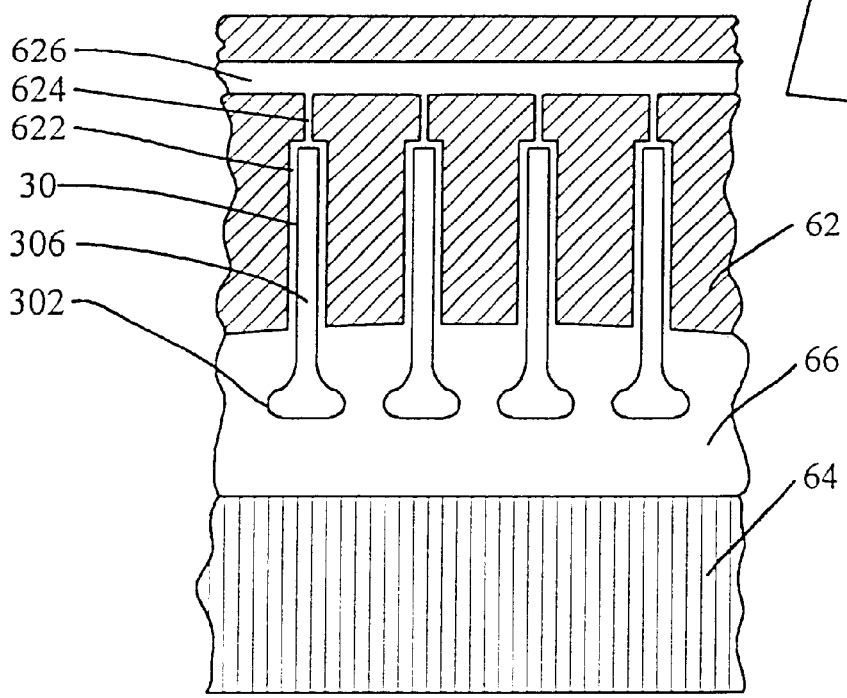
FIG. 6(B) shows the enlarged sectional view of FIG. 6(A).

As shown in FIG. 6(A) and FIG. 6(B), which show the sectional view of the molds used in producing the silicon cap shown in FIG. 4, the molding apparatus includes an outer mold 62 and an inner mold 64. The top inner wall of the outer mold 62 is provided with a plurality of ducts 622. The depth of the duct is about two thirds of the length of the fiber 30. The diameter of the duct 622 is approximately larger than the diameter of the column portion 306 by a small amount. A small passage 624, which has a diameter approximately smaller than the diameter of the column portion 206, is further provided to connect the duct 622 and a conduit 626. The conduit 626 is connected to a vacuum system (not shown).

The process of making the cap of the second embodiment is recited below.

(1) Place the outer mold 62 in an electrostatic planting (coating) system, and connect the silicon cap 15 to an electrode connected to a ground reference. It is well known that the electrostatic coating system performs the electrostatic fiber planting process. A plurality of fibers 30 are disposed in a reservoir of the system.

(2) Activate the electrostatic apparatus to perform the electrostatic fiber planting process. During the process, control the direction of movement of the fiber 30 such that the base portion 302 heads downwards. Under such a condition, each duct 622 houses one corresponding fiber 30.

(3) Activate the vacuum system, and the vacuum condition sucks up the fiber 30 in the duct 622 so that the top end of the column portion 306 of each fiber 30 touches against the top end of the corresponding duct 622. Afterwards, the electrostatic apparatus is shut down and the residual fibers 30 are removed from the surface of the outer mold 62. Or alternatively, a de-ionized air blower (not shown) may be employed to remove the residual fibers 30.

(4) The inner mold 64 is disposed to match the outer mold 62 as shown in FIG. 6(A). Using a well known compression molding or injection molding process, the silicon cap 15 is formed. At the end of this process, the silicon cap 15 is formed with the base portion 302 embedded into the top portion of the silicon cap 15 and the column portion 306 exposed to the outside of the cap, as shown in FIG. 4.

Third Embodiment

As shown in FIG. 5, a plurality of fibers 30 extending away from the cap 15 are placed on the outer surface of the silicon cap 15. Each fiber 30 includes a column portion 306 and a base portion 302 in the form of a circular plate. An adhesive layer 21 is then covered over the plurality of fibers 30 and the outer surface of the silicon cap 15. Since the entire fiber 30 is covered with the adhesive layer 21, this embodiment prevents the fiber 30 from being dislodged during use.

The process of making the cap of the third embodiment is recited below.

(1) Using a well known compression molding or injection molding, the silicon cap 15 is formed.

(2) Place the silicon cap 15 in an electrostatic planting (coating) system, and connect the silicon cap 15 to an electrode connected to a ground reference. A plurality of fibers 30 are disposed in a reservoir of the system in order to perform the electrostatic fiber planting process. Via the electrostatic fiber planting process, the plurality of fibers 30 in the reservoir are spread onto silicon cap's outer surface. Since the two ends of the fiber 30 are not identical, one can control the action of fiber 30 so that the fiber moves during the planting process with identical ends heading in the same direction. In the embodiment, the fibers move toward the outer surface with the base plate 302 heading towards the outer surface of the silicon cap.

(3) An adhesive layer 21 in liquid state, e.g. silane adhesive, is spread over the outer surface of the silicon cap 15 to cover the outer surface and the entire fiber 30.

What is claimed is:

1. A silicon cap removably mounted on the top of a cursor control device, the silicon cap having an outer surface and an inner surface, the outer surface being covered with an adhesive layer, a plurality of fibers being adhered on the adhesive layer, the silicon cap being characterized in that each fiber has a column portion and a base portion,
wherein a cross-section of the base portion is substantially larger than a cross-section of the column portion, the base portion is embedded in the adhesive layer to enhance the detachment-resistant capability of the fiber during use.

2. The silicon cap of the claim 1, wherein the base portion is provided at a bottom of the fiber.

3. The silicon cap of the claim 2, wherein the base portion is form of a circular plate shape.

4. A silicon cap removably mounted on the top of a cursor control device, the silicon cap having an outer surface and an inner surface, a plurality of fibers being adhered on the outer surface, the silicon cap being characterized in that each fiber has a column portion and a base portion,
wherein a cross-section of the base portion is substantially larger than a cross-section of the column portion, the base portion is embedded in the silicon cap to enhance the detachment-resistant capability of the fiber during use.

5. The silicon cap of the claim 4, wherein the base portion is provided at a bottom of the fiber.

6. The silicon cap of the claim 5, wherein the base portion is form of a circular plate shape.

7. A silicon cap removably mounted on the top of a cursor control device, the silicon cap having an outer surface and an inner surface, a plurality of fibers being adhered on the outer surface, the plurality of fibers being covered with an adhesive layer, the silicon cap being characterized in that each fiber has a column portion and a base portion,
wherein a cross-section of the base portion is substantially larger than a cross-section of the column portion, the base portion and the column portion are entirely covered with the adhesive layer to enhance the detachment-resistant capability of the fiber during use.

8. The silicon cap of the claim 7, wherein the base portion is form of a circular plate shape.

* * * * *